Aug. 27, 1957 H. H. GROBECKER 2,804,119
BELLING AND BEADING TOOL
Filed Jan. 14, 1954 2 Sheets-Sheet 1
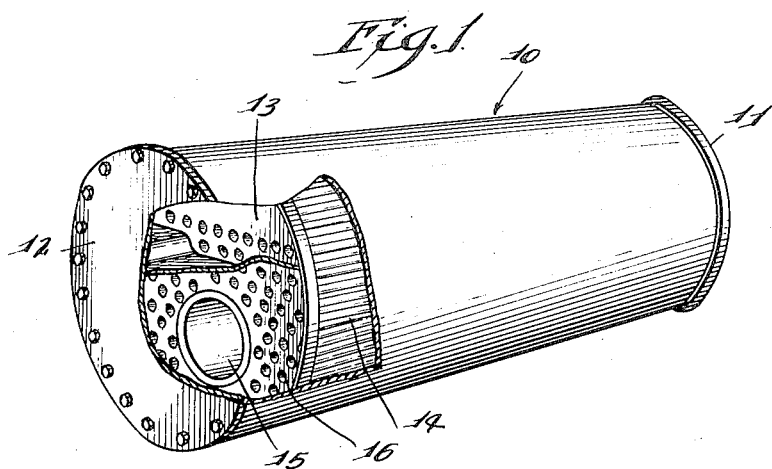
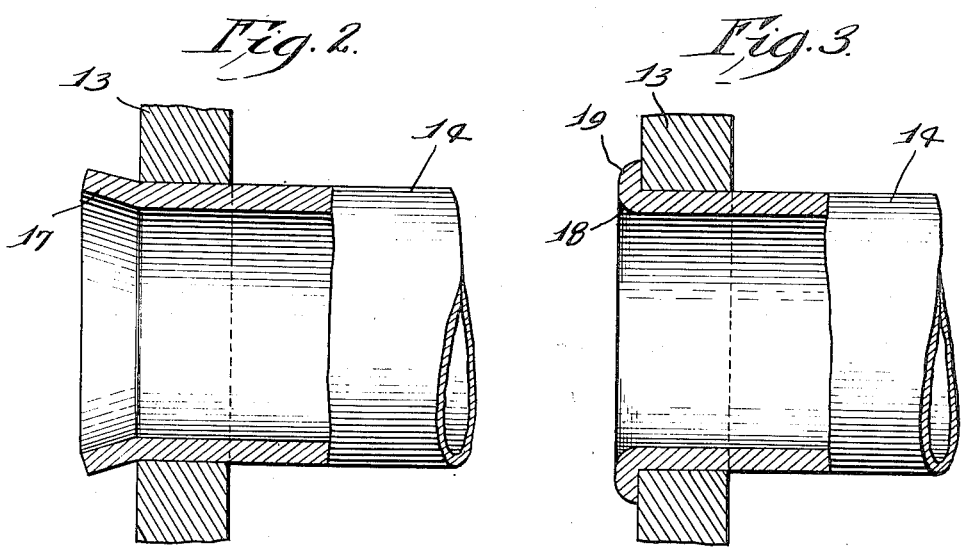
Inventor
Hugo Herman Grobecker Aug. 27, 1957     H. H. GROBECKER     2,804,119
BELLING AND BEADING TOOL
Filed Jan. 14, 1954     2 Sheets-Sheet 2
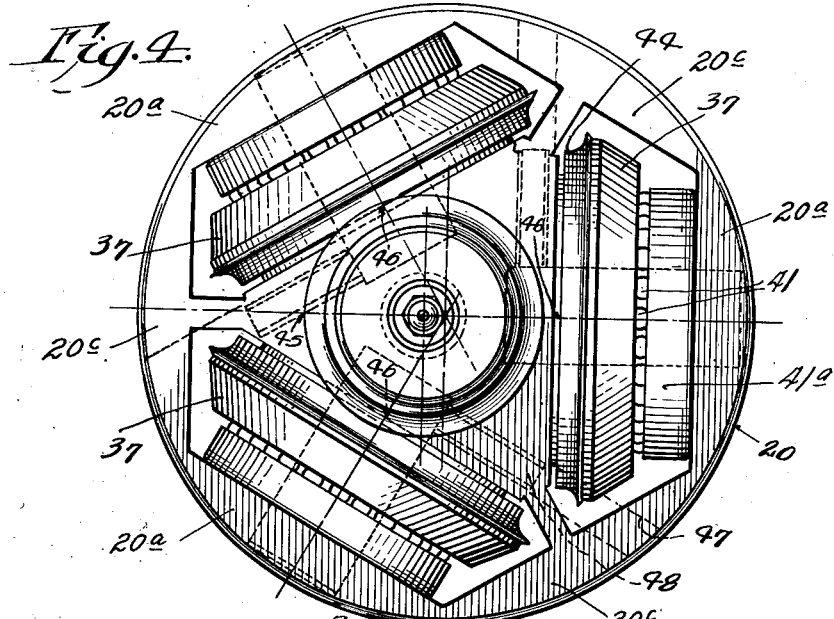
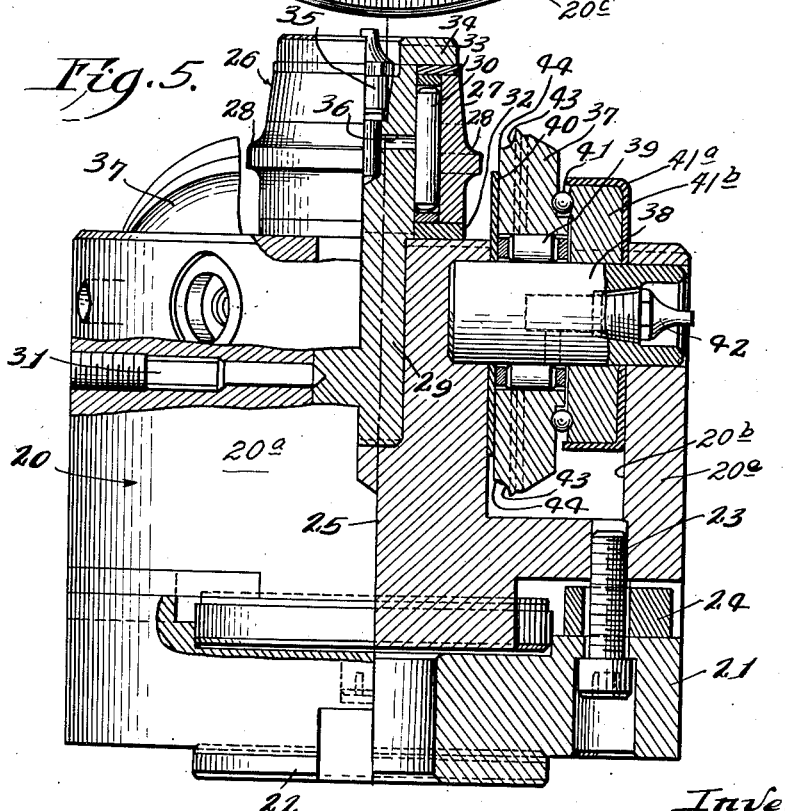
Inventor
Hugo Herman Grobecker United States Patent Office 2,804,119
Patented Aug. 27, 1957

2,804,119

BELLING AND BEADING TOOL

Hugo Herman Grobecker, Milwaukee, Wis., assignor to Cleaver-Brooks Company, a corporation of Wisconsin Application January 14, 1954, Serial No. 403,964

5 Claims. (Cl. 153—79)

This invention relates to a rotary tool for forming metal and more particularly to a belling and beading tool for securing tubes in the tube sheet of a boiler.

General practice in the past has been to secure tubes in the tube sheets of boilers by a hand operation. A skilled workman placed a tool in the end of an air hammer to do the beading of the end of the tube against the tube sheet to hold the tube in place. The beading tool appeared very much like the extended thumb and finger of a person's hand with the curved portion between the juncture of the finger and thumb being the working portion of the tool which belled and beaded the end of the tube. This operation has been expensive in time and costs primarily due to the labor factor.

The present invention is concerned with a tool intended to be power driven and to accomplish the belling and beading of the tubes almost as quickly as the tool can be moved from one tube to another. The time required for this manufacturing operation is, therefore, cut down extensively and the beading of each tube is uniform and like that on all of the other tubes in a given boiler.

It is the primary object of this invention to provide a tool of the character described which may perform a very satisfactory metal forming operation.

A further object is to provide a tool capable of providing a smooth bead on a tube in turn making a sound connection between tubes and tube sheet able to withstand operating pressure in a boiler.

Another object is the provision of a tool of the character described utilizing rollers to perform the material forming operations, which rollers are shaped to contribute to long life in service.

A further object is to provide a tool of the character described utilizing rollers particularly shaped to permit the use of comparatively large diameter rollers.

Further objects, features and advantages of the invention will be apparent from the following description taken in conjunction with the accompanying drawings in which:

Figure 1 is a perspective view of one type of boiler partially broken away to show one tube sheet and a number of tubes therein;

Figure 2 is a fragmentary sectional view through a portion of a tube sheet and tube therein showing the outer end of the tube slightly flared by a tube expanding operation done before use of the tool of the present invention thereon;

Figure 3 is a view similar to Figure 2 showing the final form of the tube in the tube sheet after belling and beading.

Figure 4 is a front view of the tool of the invention looking toward the working rollers; and Figure 5 is an elevational view in half section and partially broken away illustrating the manner in which the rollers are mounted in the tool housing.

Figures 1 to 3 illustrate the general and immediate use for the belling and beading tool of this invention. In Figure 1, a boiler shell 10 is provided with end closures 11 and 12 and is broken away to show the tube sheet 13 in which fire tubes 14 are mounted. A central large fire tube 15 is provided for the first pass of the combustion products through the boiler. The combustion products pass in turn through certain paths of the smaller tubes 14 to heat water to steam in and around the fire tubes between the tube sheets in the boiler.

Manufacturing procedures in the past have required the insertion of the fire tubes 14 through trepanned holes in the tube sheets and after initially expanding the tubes by hand tools, the ends 16 of the tubes were beaded against the outer surface of the tube sheet by hand to seal the tubes thereto.

The initial operation of the belling and beading tool is to roll a flare 17 into a radii 18 and 19 on the outer end of the fire tube 14 and force the tube radially outwardly into intimate contact with the opening in the tube sheet. The flared portion 17 is beaded to the form illustrated in Figure 3. This bead is annular in shape and has an inner arcuate surface 18 joined to an arcuate outer surface 19 securely fastening the tube in the tube sheet.

In contrast to former procedure, the present invention provides a tool which can be mounted on a rotatable shaft for performing the belling and beading operation automatically. The shaft is rotated by power and is advanced toward the end of a tube to bring the tool into contact with the end permitting the rollers to roll the flare into a bead as illustrated in Figures 2 and 3.

The particular form of the tool of this invention is shown in Figures 4 and 5. The tool has a housing 20 for the rollers which perform the work. A back up plate 21 is utilized to secure the housing to a shaft 22 by means of machine screws 23 which cooperate with nuts 24 accessible from the outer surface of the housing. The housing is a built up section of machined parts including a base part 20a (Fig. 5) machined to provide recesses 20b for rollers 37 and pieces 20c (Fig. 4) which are welded together at their narrowest portions as seen in Fig. 4. After welding, the parts are then ground to proper shape. The axis 25 of the housing coincides with the axis of the shaft 22 upon which it is mounted. Ordinarily the housing is cylindrical, however, other shapes may be utilized if desired.

The work upon the tube is accomplished by cooperating rollers. A central roller 26 is provided with a conical outer surface 27 bounded at its base by an annular section 28 which is arcuate in cross section and extends through about 90° of arc. The particular radius of curvature is chosen to be proper for the bead desired on a particular size tube.

The roller 26 is mounted on a stub shaft 29 by a plurality of roller bearings 30. The stub shaft is held in place by a set screw 31 and thrust on the roller is taken up by a bronze bearing 32 at the base of the roller and a similar bronze bearing 33 between the roller and cap 34 on the shaft. A grease fitting 35 is provided to supply lubricant to the roller bearings through a lateral passage 36.

The axis of the roller 26 is eccentric to the axis of the roller housing. In order to bring the arcuate surface 28 into proper relation with the tube, the conical surface 27 will first contact the tube as the tool is moved toward the tube to produce the inner arcuate surface or bell form 18 as illustrated in Figure 3. Upon further advance of the tool, the flare will strike the arcuate portion 28 starting the bead. The metal forming is completed by the rotation of the tool permitting the roller to roll over the tube surface as it is advancing.

The outer contour 19 of the bead is formed by a plurality of rollers cooperating with the central roller 26. These rollers 37 are shown as three in number and each is similar to the others. A plurality of radially positioned short shafts 38 are pinned in the housing to support each roller 37 on bearings 39. A bronze bearing 40 is placed on the inner side of each roller 37 and a thrust bearing 41 having a standard dust and chip cap 41a about its supporting race 41b is positioned on the outer side of the roller. A grease fitting 42 is also provided for lubricating the roller bearings supporting the rollers 37.

The form of the working surface of the rollers 37 is chosen to cooperate with the arcuate section 28 of the central roller. Each arcuate surface 43 has a curvature as desired in the final bead surface 19 illustrated in Figure 3. In addition, the inner portion 44 comprises a short cylindrical section forming a transition between a cylinder and the arcuate surface 43. This cylindrical surface in effect overlaps the extent of the arcuate surface 28 on the central roller. By this action, any fins formed by the rollers will be removed by this overlapping of the rolling surfaces.

The eccentric mounting of the central roller may best be seen in Figure 4. The eccentricity is chosen on a line bisecting the angle between two of the outer rollers 37 so that the point 45 on the central roller farthest from the center of the roller housing will limit the extent to which the inner roller can form the bead on the tube. This point 45 is further from the center of the roller housing than is the point 46 on each of the rollers 37, which is the point on the rollers 37 closest to the center of the housing. These two points, in their travel around the tube, thus will overlap avoiding the formation of any fins during the rolling operation.

The particular advantage of the present roller form is that each roller may be made of considerable diameter to add strength to the tool and yet avoid any binding of the rollers on the circular form of the bead. Each roller, in effect, works only on one half of the bead form. The construction of the tool is such that any one or all of the rollers may be easily and quickly changed if needed. The tool is formed with lateral bores 47 in which set screws 48 may be placed to hold the shafts 38 in place. With removal of the shaft 38, any of the rollers 37 may be easily and quickly changed.

The time necessary to bead a tube using the present tool is surprisingly short in that a tube can be beaded and finished in a matter of seconds. The speed with which a boiler can be completed thus is more dependent upon the time required to move the tool from one tube to another since this time is longer than the actual operating time on each tube.

The foregoing detailed description has been given for clearness of understanding only, and no unnecessary limitations should be understood therefrom, for some modifications will be obvious to those skilled in the art.

I claim:

1. A rotary tool for belling and beading tubes in a tube sheet, comprising: a rotatable roller housing adapted for connection to a driven shaft; a central roller on the housing having a flared outer surface adapted to enter a tube and roll upon the tube inner surface to bell the end of the tube radially outward; and a plurality of outer rollers on the housing positioned to engage the belled tube and form only the outer portion of the tube bead cooperatively with the central roller, said central roller being offset eccentrically to the axis of rotation of the housing between two adjacent outer rollers so that all the rollers may contact the tube bead at the same time.

2. A rotary tool for belling and beading tubes in a tube sheet, comprising: a rotatable roller housing; a central roller on the housing having a flared outer surface adapted to enter a tube and roll upon the tube inner surface to bell the end of the tube radially outward; an annular outwardly curved portion on said central roller at the base of said flared surface adapted to form only the inner portion of the tube bead, and a plurality of outer rollers on the housing positioned to engage the belled tube and form only the outer portion of the tube bead cooperatively and at the same time with the central roller, said central roller being positioned eccentric to the axis of rotation of the housing between two adjacent outer rollers to permit maximum sized rollers.

3. A rotary tool for securing tubes in a tube sheet, comprising: a cylindrical housing; a plurality of radial shafts mounted in the housing; a roller freely rotatable on each shaft and extending outwardly of the housing, each roller having an annular face arcuate in cross section and bounded by a cylindrical transition section on the side adjacent the center of the tool; and a freely rotatable central roller having a supporting shaft supported in the housing eccentric to and parallel to the tool axis, said central roller shaft being positioned off center of the housing on a line midway between two adjacent radial shafts to permit the rollers to be of maximum size, said central roller having a generally conical outer surface of a size to enter the tube and bounded at its base by an annular section arcuate in cross section, the path of the arcuate section of the central roller overlapping the path of the cylindrical transition section of said plurality of rollers upon rotation of the tool, first to permit the central roller to bell a tube upon rotation of the tool therein and then beading of the tube cooperatively and at the same time between the arcuate sections of the rollers with each roller working upon the tube substantially only on one half of the bead as the tool is advanced toward the tube.

4. A rotary tool for securing tubes in a tube sheet, comprising: a cylindrical housing having a forward roller supporting portion and a rearward base portion for attachment to a rotatable shaft; a plurality of radial shafts mounted in the housing; a roller freely rotatable on each radial shaft and extending outwardly of the housing, each roller having an annular face arcuate through about 90° in cross section and bounded by a cylindrical transition section on the side adjacent the center of the tool; and a freely rotatable central roller having a supporting shaft eccentric to and parallel to the tool axis and positioned midway between adjacent radial shafts, said central roller having a generally conical outer surface of a size to enter the tube and bounded at its base by an annular section arcuate through about 90° in cross section, the arcuate section of the central roller overlapping the path of the cylindrical transition section of said plurality of rollers, first to permit the central roller to bell a tube upon rotation of the tool therein and then beading of the tube cooperatively and at the same time between the arcuate sections of all the rollers as the tool is advanced toward the tube.

5. A rotary tool for securing tubes in a tube sheet comprising: a roller housing for attachment to a rotatable shaft; a central roller and at least three outer rollers having means supporting the rollers on the housing, said rollers having arcuate faces for working substantially only on one-half of a tube bead and all of the rollers being positioned to finish rolling the tube bead at the same time, and said central roller being offset eccentrically of the housing axis of rotation generally equidistant between two adjacent outer rollers to permit maximum sized rollers for a given tube size.

References Cited in the file of this patent

UNITED STATES PATENTS

| 323,109 | Campbell | July 28, 1885 |
| 582,064 | Hutchison | May 4, 1897 |
| 1,752,508 | Schultis | Apr. 1, 1930 |

FOREIGN PATENTS

| 11,901 | Germany | Apr. 28, 1880 |
| 5,474 | Great Britain | Mar. 30, 1889 |
| 174,393 | Great Britain | Feb. 2, 1922 |
| 769,618 | France | Feb. 4, 1935 |